US007007759B2

(12) United States Patent
Harrington et al.

(10) Patent No.: US 7,007,759 B2
(45) Date of Patent: Mar. 7, 2006

(54) METHOD AND SYSTEM FOR DIRECTING FLUID FLOW

(75) Inventors: Michael J. Harrington, Bellevue, WA (US); Jeffery Dean Rabe, Renton, WA (US); David Alan Nickel, Enumclaw, WA (US)

(73) Assignee: R3 Pump Technologies, LLC, Bellevue, WA (US)

( * ) Notice: Subject to any disclaimer, the term of this patent is extended or adjusted under 35 U.S.C. 154(b) by 149 days.

(21) Appl. No.: 10/659,986

(22) Filed: Sep. 11, 2003

(65) Prior Publication Data
US 2005/0056422 A1 Mar. 17, 2005

(51) Int. Cl.
*E21B 43/02* (2006.01)
*C02F 1/00* (2006.01)

(52) U.S. Cl. .................. 166/372; 166/370; 166/67; 210/760; 210/221.2; 210/205; 210/117; 405/128.25

(58) Field of Classification Search ........ 166/369–372, 166/371, 67; 405/128.25, 128.45, 128.5; 210/117, 205, 218, 220, 747, 760, 221.2; 422/28
See application file for complete search history.

(56) References Cited

U.S. PATENT DOCUMENTS 3,680,704 A * 8/1972 Schaefer .................... 210/220
5,318,698 A * 6/1994 Bernhardt .............. 405/128.25
6,210,073 B1   4/2001 Buehlman et al.

OTHER PUBLICATIONS

"Field Applications of In Situ Remediation Technologies: Ground-Water Circulation Wells," Oct. 1998, pp. i-32, EPA 542-R-98-009, United States Environmental Protection Agency, Washington DC, http://www.epa.gov/swertio1.
Andrew Curtis Elmore et al., "Modeling a Ground Water Circulation Well Alternative," Ground Water Monitoring & Remediation 24, February 2004, pp. 66-73, vol. 1, National Ground Water Association, U.S.A.
Andrew Curtis Elmore et al., "Model-Predicted Groundwater Circulation Well Performance," Practice of Periodical of Hazardous, Toxic, and Radioactive Waste Management, Oct. 2001, pp. 203-210, vol. 5, No. 4, U.S.A.

* cited by examiner

*Primary Examiner*—David Bagnell
*Assistant Examiner*—Matthew J. Smith
(74) *Attorney, Agent, or Firm*—John S. Jardine

(57) ABSTRACT

A gas/liquid pump moves liquid by passing gas up through it. Pumping is accomplished by the liquid's moving through three conduits. The first, a collector conduit, transports the liquid to the bottom of the unit. The second, a gas-lift conduit, mixes the liquid and gas at the bottom and transports the mixture upwards, owing to the rising action of the bubbles and the resulting decreased density of the gas/liquid mixture. At the top of the gas-lift conduit, some of the gas escapes from the liquid and out of the unit. The lifted liquid then returns to near its original density and exits the unit through the down and out conduit.

31 Claims, 11 Drawing Sheets

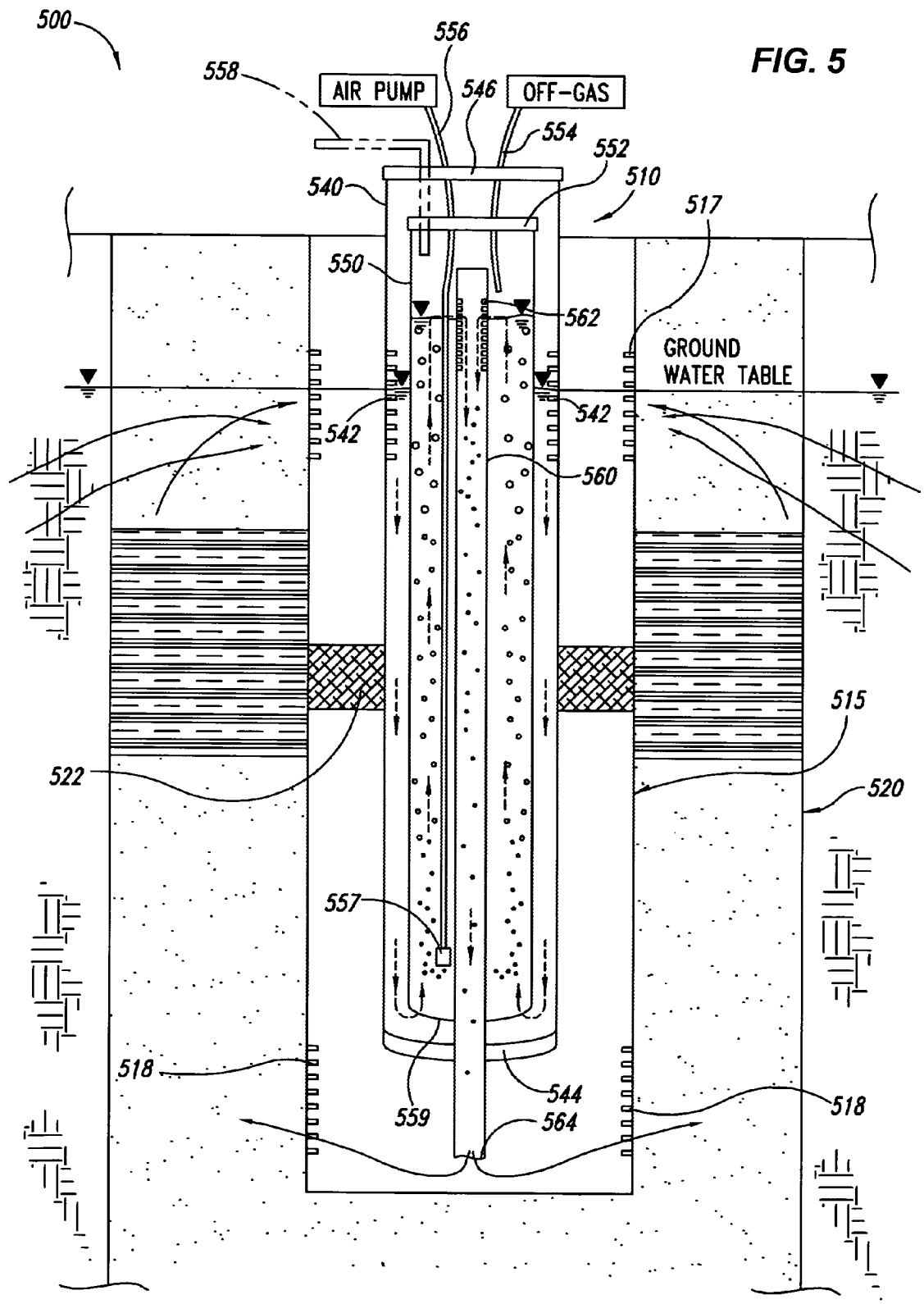

METHOD AND SYSTEM FOR DIRECTING FLUID FLOW

FIELD OF THE INVENTION

The present invention relates generally to methods and systems for generating and directing fluid flow, and more particularly, to methods and systems that employ a gas to direct fluid flow.

BACKGROUND

Contaminated groundwater has become an increasingly common problem facing industry, the government, and the general public. Leaks from below-ground storage tanks, above-ground storage facilities, surface discharges, and other sources contaminate groundwater and soil, posing a variety of problems to the general public as well as the environment. The most common types of contaminants are volatile organic compounds (VOCs) which are pollutants of petroleum based products and chlorinated solvents. Regulatory mandates have demanded assessment and remediation of the contamination; however, efficient and cost-effective solutions for containment and remediation are still needed.

Previously, contaminated groundwater was pumped to above-ground facilities, treated, and returned to the phreatic zone. These "pump-and-treat" or above-ground methods are expensive and generally treated the groundwater only. The pump-and-treat method does not provide treatment to the soil in the vadose zone.

Various in situ systems have been attempted, including air sparging, blast-enhanced fracturing, directional wells, in situ vacuum, groundwater recirculation wells, hydraulic and pneumatic fracturing, in situ flushing or injection/recirculation, in situ stabilization/solidification, permeable reactive barriers, and thermal enhancements. Various in situ biological treatments have included bioslurping, intrinsic bioremediation, monitoring natural attenuation, and phytoremediation. Additionally, various electrokinetic and electrolysis systems have been attempted. Each of these solutions has a variety of drawbacks, including the expense to implement and maintain the system, the level of effectiveness, and the potential for making the contamination worse.

For example, air sparging has been used to reduce concentrations of volatile organic compounds (VOCs) found in petroleum products. Air sparging is generally more applicable to the lighter gasoline constituents because they readily transfer from the dissolved to the gaseous phase. Appropriate use of air sparging may require that it be combined with other removal methods. Air sparging should not be used if the following site conditions exist: free product is present; near subsurface confined spaces; highly impermeable soils, nor when contaminated groundwater is located in a confined aquifer system.

If free product is present, due to the flow pattern created, air sparging can create groundwater mounding which could potentially cause free product to migrate radially away from the air sparge well; expanding the plume. When nearby basements, sewers, or other subsurface confined spaces are present at the site, air sparging should also not be used. Potentially dangerous constituent concentrations could accumulate in basements and other depressions unless a vapor extraction system is used to control vapor migration. When contaminated groundwater is located in the confined aquifer system, air sparging should also not be used. Air sparging cannot be used to treat groundwater in a confined aquifer because the injected air would be trapped by the saturated confine layer and could not escape to the unsaturated zone.

The effectiveness of air sparging depends primarily on two factors:

1. Vapor/dissolved phase partitioning of the constituents determines the equilibrium distribution of a constituent between the dissolved phase and the vapor phase. Vapor/dissolved phase partitioning is, therefore, a significant factor in determining the rate at which dissolved constituents can be transferred to the vapor phase.

2. Permeability of the soil determines the rate at which air can be injected into the saturated zone. It is the other significant factor in determining the mass transfer rate of the constituents from the dissolved phase to the vapor phase.

Stratified or highly variable heterogeneous soils typically create the greatest barriers to air sparging. Both the injected air and the stripped vapors will travel along the paths of least resistance (coarse-grained zones) and could travel a great lateral distance from the injection point. This phenomenon could result in the contaminant-laden sparge vapors migrating outside the vapor extraction control area.

U.S. Pat. No. 6,210,073 issued to Buehlman, et al. (Buehlman) attempts to provide a solution for highly stratified soil by implementing multi-level fluid transfer systems, or individual air-sparging supply lines for each stratification of soil. This process not only incurs multiple system costs, but also requires additional cost to accurately map the stratification. Error with respect to mapping the stratification results in an ineffective system, or worse, a remediation system that spreads the plume of contamination.

Prior art FIG. 1 illustrates an in-well vapor stripping process 100. This process creates a groundwater circulation pattern A. An air injection blower 110 injects air into an air injection line 120. The air exits the air injection line 120 below the water table percolating up through the well. A packer 130 forces the air-stripped water out through the upper recharge screen 140. The contaminated air 150 is collected through a vacuum extraction blower 160 and treated.

Limitations reported for this technology include limited effectiveness in shallow aquifers, possible clogging of the well due to precipitation and the potential to spread the contaminant plume if the system is not properly designed or constructed.

This technology pulls the groundwater up and beneficially increases the level of dissolved oxygen as it does so. However, the water is released at the top of the groundwater, and the bottom of the vadose zone; the region which already has the highest levels of dissolved oxygen.

The convection current generated acts to push the contaminate plume away from the well. Perhaps this final limitation is the most significant and fatal flaw. Spreading the contaminant plume in an already contaminated region is harmful to groundwater remediation, as it pushes contaminants even further from a contaminated region.

Accordingly, there is a need to address the limitations associated with air sparging and the other available in situ remediation techniques and to provide an effective, cost-efficient method and system for in situ remediation of contaminated groundwater and soil.

SUMMARY

The present invention is directed to addressing the problems above and others. Briefly, the present invention's fluid flow system consists of a gas/liquid pump, which acts to move liquid by passing gas up through it. This pumping is accomplished by the liquid's moving through three conduits. The first, a collector conduit, transports the liquid to the bottom of the unit. The second, a gas-lift conduit, mixes the liquid and gas at the bottom and transports the mixture upwards, owing to the rising action of the bubbles and the resulting decreased density of the gas/liquid mixture. At the top of the gas-lift conduit, some of the gas escapes from the liquid and out of the unit. The lifted liquid then returns to near its original density and exits the unit through the third conduit, a down and out conduit.

Advantages of the present invention will become apparent from the following detailed description when taken in conjunction with the drawings, in which:

BRIEF DESCRIPTION OF THE DRAWINGS

FIG. 5 illustrates an exemplary embodiment of a fluid flow remediation system;

DETAILED DESCRIPTION

Figure 1:
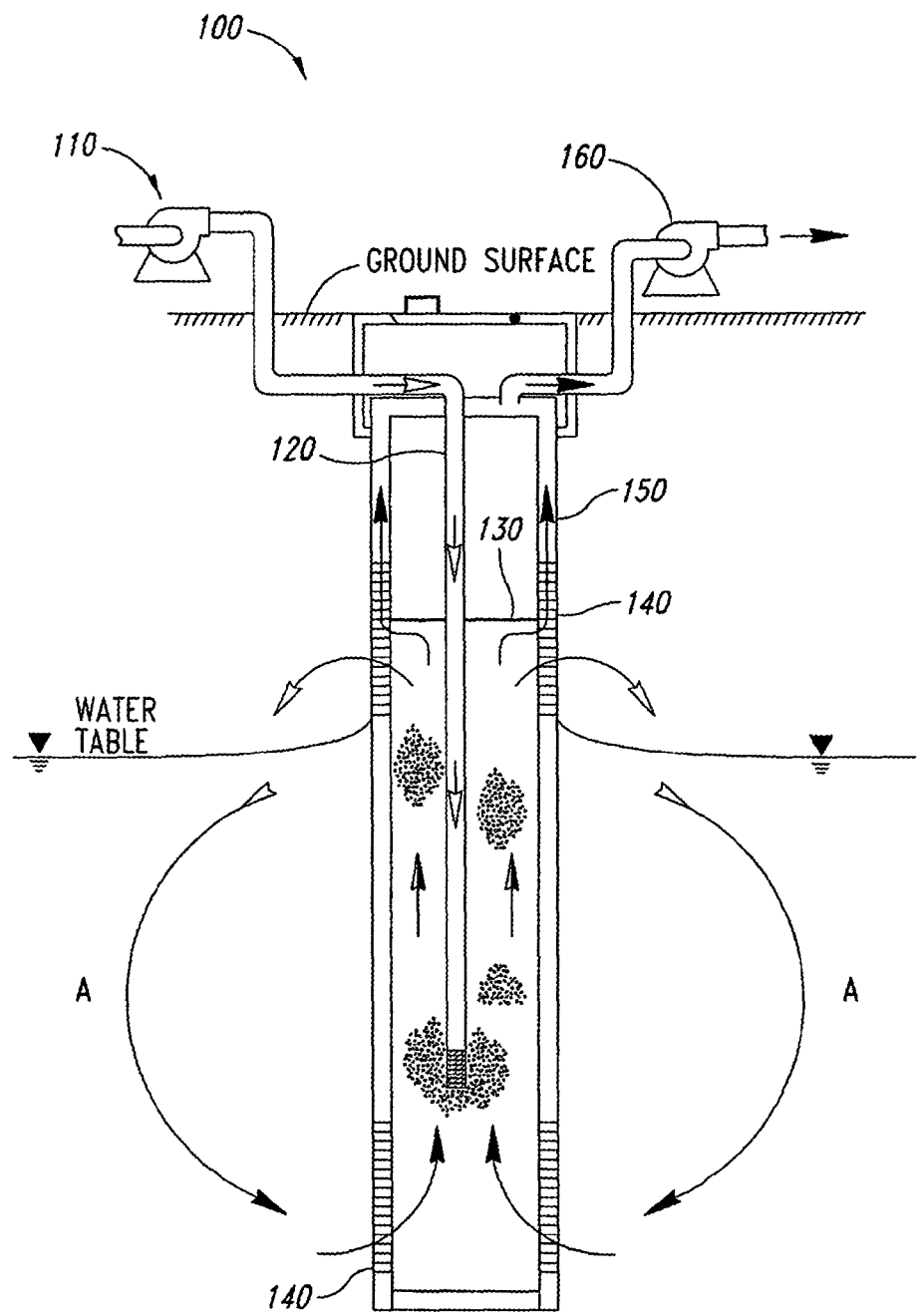
FIG. 1 illustrates an in-well vapor stripping process.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments can be utilized, and other changes can be made, without departing from the spirit or scope of the present invention. The following detailed description is, therefore, not to be taken in a limiting sense, and the scope of the present invention is defined by the appended claims.

In *Environmental Engineering Reference Manual*, Professional Publications, Belmont, Calif., 2001, p. 18–2, which is hereby incorporated by reference in its entirety, Michael R. Lindeburg, P. E., states:

Pumps can be classified according to the method by which pumping energy is transferred to the fluid. This classification separates pumps into positive displacement pumps and kinetic energy pumps.

The most common types of positive displacement pumps are reciprocating action pumps (which use pistons, plungers diaphragms, or bellows, and rotary action pumps (using vanes, screws lobes, or progressive cavities). Such pumps discharge a fixed volume for each stroke or revolution. Energy is added intermittently to the fluid.

Kinetic pumps transform fluid kinetic energy into fluid static pressure energy. The pump imparts the kinetic energy; the pump mechanism or housing is constructed in a manner that causes the transformation. Jet pumps and ejector pumps fall into this kinetic energy category, but centrifugal pumps are the primary examples.

In some embodiments of the present invention, the fluid flow system's pump has no moving parts. Instead, in these embodiments, the fluid flow system of the present invention imparts energy to the fluid by converting the energy of pressurized gas first into potential energy. The potential energy of the pressurized gas released at the bottom of the gas-lift passage elevates the liquid above it to a height proportionate to the volume of liquid displaced by the gas. In so doing the potential energy of the pressurized gas is efficiently transferred into the potential energy of gas/liquid mixture. The potential energy of the elevated gas/liquid mixture is then transformed into kinetic energy as the gas/liquid mixture rises, owing to the pushing action of the rising bubbles and, to a much greater extent, the density difference between the gas/liquid mixture and the surrounding liquid. An equilibrium is then established, wherein the gas exiting the top of the liquid is equaled by the gas entering the bottom of the gas-lift conduit. The height of the gas/liquid mixture above the static fluid level is then proportionate to the volume of liquid displaced by the gas traveling through it. As the gas/liquid mixture degasses, at the top of the gas-lift passage, the fluid returns to near its original density, and falls back down to the original elevation. Because incoming and/or exiting liquid flows are confined by conduits into and/or out of the gas-lift passage, a controllable and directional fluid flow is generated.

Although some embodiments of the invention have no moving parts, a system that includes moving parts to assist in moving fluid through the various parts of the system described herein is not precluded and is within the spirit and scope of the present invention.

While elegantly in concept, the applications for the fluid flow system described herein are myriad. The first application, the fluid flow remediation system, will be discussed in greatest detail. This in-depth discussion will then serve as the foundation for the fluid flow applications which follow in this description.

In one embodiment of the invention, the fluid flow remediation system is placed underground, situated in a specifically designed well. The well is constructed with well screens at the top and bottom ends of the decontamination system. The top well screen is of sufficient height as to encompass both the highest and lowest observed and/or predicted (depressed) groundwater elevations. The well is completed by surrounding the outside of the screens with sand or other similarly hydraulically conductive material.

This embodiment of the invention also includes an impermeable layer between upper and lower well screens, outside the well, to prevent convection currents "short-circuiting" up the outside of the well. A ring seals the device to inside of the middle of the well to preclude vertical, in-well flow.

The fluid flow remediation system of the present invention can utilize other known remediation techniques such as soil vapor extraction techniques simultaneously with other modifications. As will be understood, with the principles taught herein additional embodiments of the invention may be obtained through the use of bioremediation principles and other physical and chemical treatment technologies.

Various embodiments of the system described herein may include one or more of the following benefits:

1. The contamination plume is reduced or eliminated;
2. VOCs are removed from the groundwater via in-well air stripping;
3. Surrounding soils are flushed by convection currents generated; and
4. Dissolved oxygen is increased in the groundwater, promoting biological activity and volatilization of contaminants.

Figure 2:
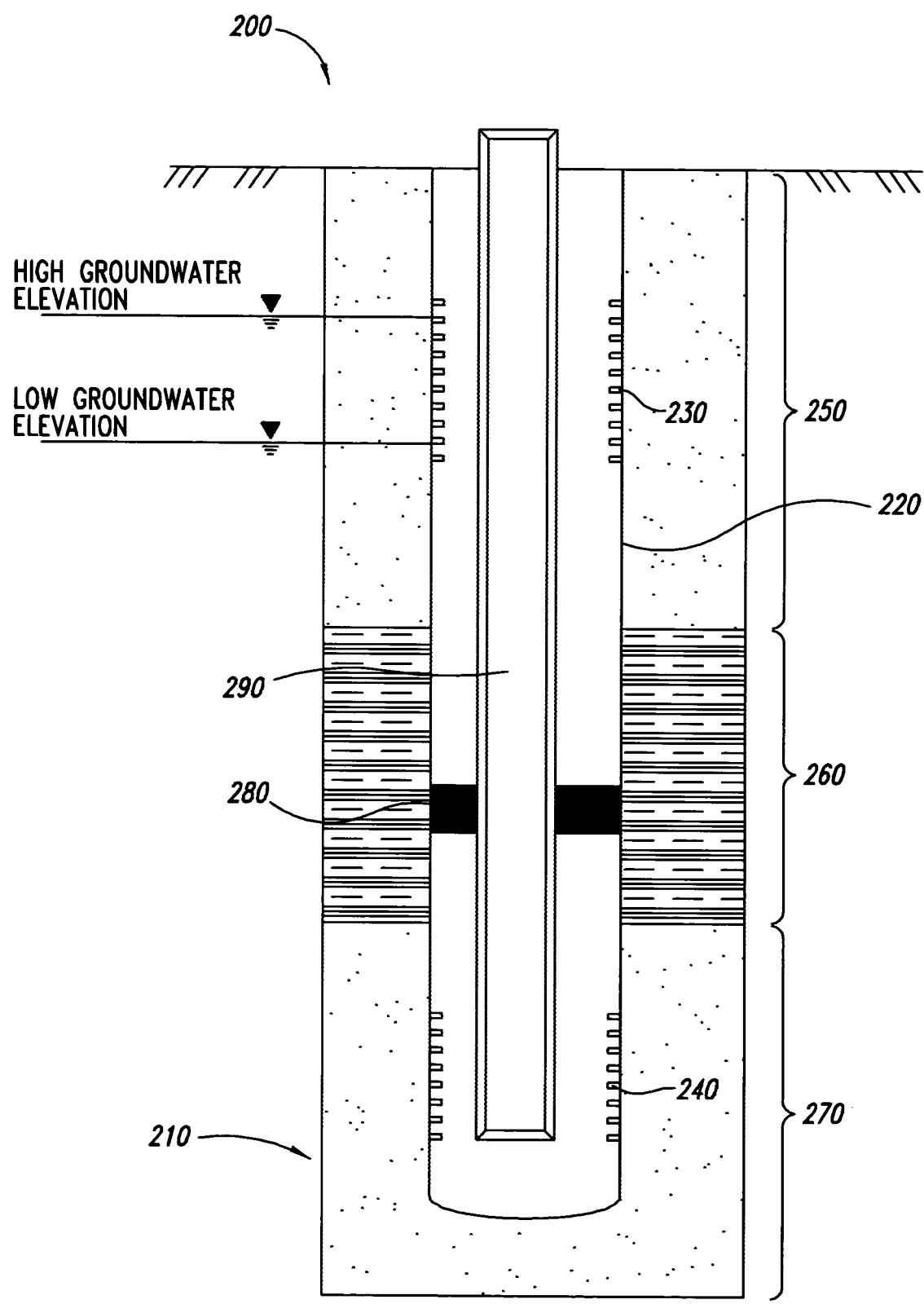
FIG. 2 illustrates a well or borehole construction surrounding a remediation system in accordance with an aspect of the invention.

FIG. 2 illustrates one embodiment of the current invention, namely, the well or borehole 200 construction surrounding the remediation system. In the illustrative embodiment, a borehole 210 is drilled of sufficient diameter to allow a casing 220 to be inserted thereof The casing 220 includes a first well screen 230 at an upper inlet end of the casing 220 and a second well screen 240 at a lower outlet end of the casing 220. The first well screen 230 is positioned to extend a range including the expected high and low ground water elevations and accounts for additional drawdown created by the fluid flow. By drawing intake water from at, or near, the groundwater's surface, treatment will be given to the highest concentrations of contaminants, which are less dense than water. A third region 270 in the lower portion of the borehole 210 may include a porous material surrounding the second well screen between the casing 220 and the borehole 210.

After installing the casing 220 in the borehole 210, filler material may be placed around the outside of the casing between the casing and the borehole to enhance the operation of the remediation system. In one embodiment of the invention, three regions of material are used. An upper region 250 of the borehole 210 includes a porous material surrounding the screen 230. The porous material may, for example, include sand in the 2 to 20 size range. A lower region 270 at the bottom of the borehole 210 may also include a porous material surrounding the second well screen between the casing 220 and the borehole 210. A, middle region 260 of the borehole 210 includes an impermeable layer filling the gap between the borehole 210 and the casing 220. The impermeable layer may, for example, be bentonite. The impermeable layer acts to preclude vertical flow adjacent to the outside of the well's casing and causes the convection currents to pass through the surrounding matrix. Shown in FIG. 2, an impermeable ring 280 is positioned between the casing 210 and the remediation system 290 to hydraulically separate the casing from the remediation system. The impermeable ring also provides stability to the remediation system within the casing. The impermeable ring serves to block in-well vertical flow outside of the remediation device 290. The impermeable ring may, for example, be a packer assembly, metal plate, rubber gasket, grout seal, or an inflatable/deflatable cylindrical shape, which ensures one-directional flow of water into the well, in through the upper screen in the casing, and out of the well's lower screen.

In operation, water enters the decontamination system at the elevation of the water table into the intake conduit, filling the intake conduit. The intake conduit is fluidly connected to the gas-lift conduit at an open lower end of the gas-lift conduit. Thus, as the intake conduit fills, so too does the gas-lift conduit.

Air (or another gas) is injected into the gas-lift conduit through a gas injection line using a vacuum blower, compressor, diffuser plate, or other means releasing bubbles into the contaminated groundwater. The resulting bubbles aerate the water, forming an air-lift pumping system and causing groundwater to flow upward in the gas-lift conduit.

The gas bubbles rise through the water in the gas-lift conduit and also lift the water due to a density gradient (groundwater in the gas-lift conduit containing air bubbles is less dense than groundwater in the intake conduit without bubbles). As the bubbles rise through the VOC-contaminated groundwater, those compounds with higher vapor pressures are transferred from the liquid to the gas phase, through an air stripping process.

Conversely, as the air passes through the water, $O_2$ is transferred, increasing the level of dissolved oxygen in the groundwater. Biological remediation of the surrounding soils and groundwater is thereby accelerated, as oxygen is typically the least available essential nutrient in these highly reduced environments. The elevated levels of dissolved gases in the water exiting the fluid flow pump system also act to volatilized contaminants in the surrounding soil water matrix. The air/water mixture rises until it reaches an equilibrium head above the water table, at the top of the gas-lift conduit. The height the air/water mixture rises above the surrounding groundwater table and is proportionate to the volume of water displaced by the air passing through the gas-lift passage.

An off-gassing line allows gas to be removed from the top of the gas-lift conduit, causing the liquid's density to increase. The off-gassing line may be under a vacuum. The vacuum would act to increase the height differential between the static groundwater level and the air/water liquid level in the gas-lift passage, increasing the pump's head and fluid flow rates. The vacuum may also accelerate mass transfer rates of the VOCs from the groundwater to the air passing through the gas lift passage. The vacuum at the top of the gas lift passage may be generated from the intake of the air supply blower, from a separate power source, or as part of a larger soil vapor extraction (SVE) system. The vapor may be collected for treatment and/or recirculation or may be released directly to the atmosphere. The water at the top of the gas-lift passage now returns to near its original density and having the VOCs removed then sinks through the down and out conduit. At the lower well screen, the decontaminated water flows out into the surrounding soil.

Figure 3:
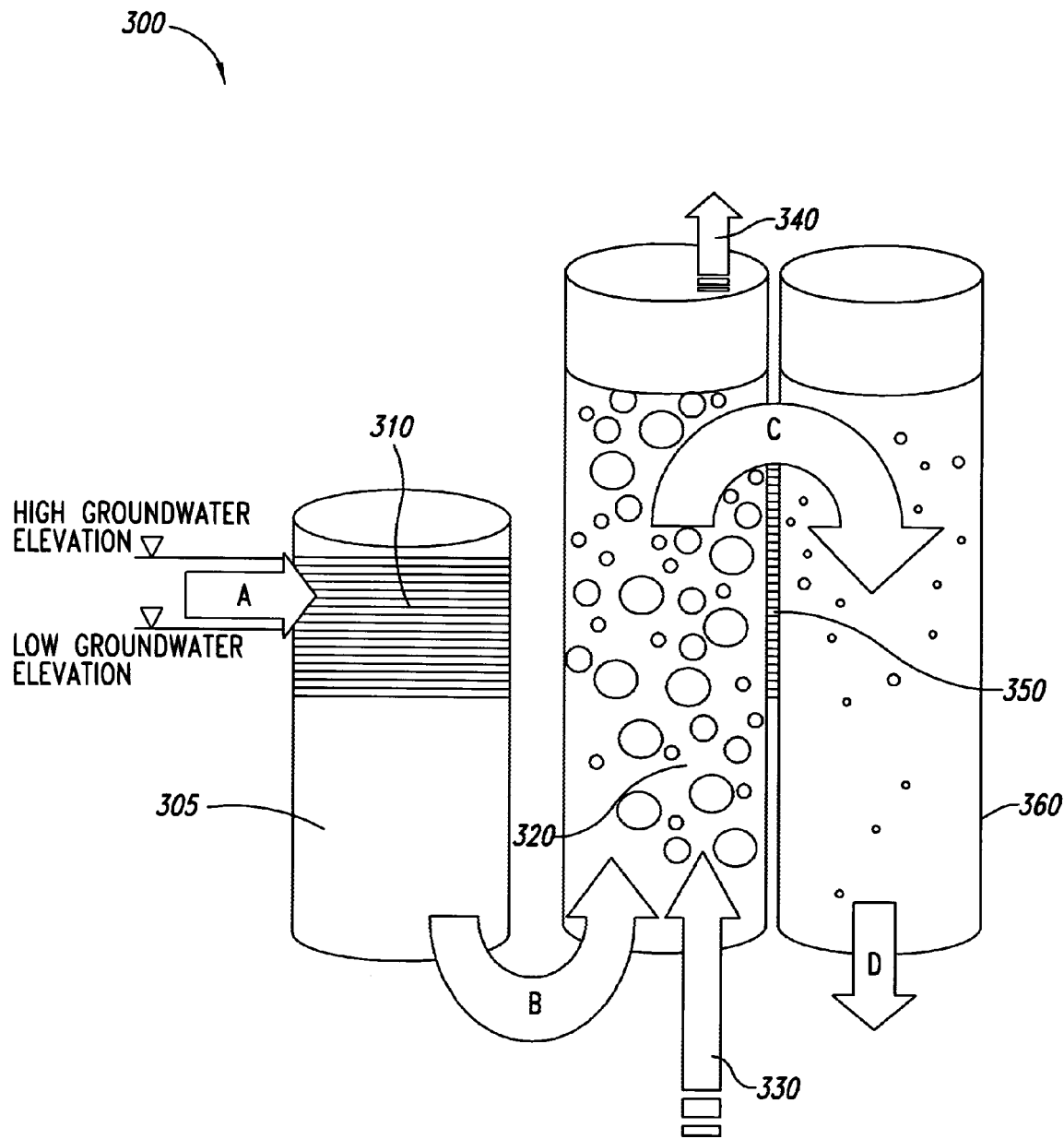
FIG. 3 illustrates the groundwater flow and operation of a fluid flow remediation system in accordance with an aspect of the invention.

FIG. 3 illustrates the groundwater flow and operation of the fluid flow remediation system of the current invention, according to one embodiment of the invention. Along flow arrow A, groundwater enters an intake conduit 305 through an intake screen 310. The intake screen 310 encompasses the span of the high, low, and anticipated drawdown groundwater levels. Groundwater flows from the intake conduit 305 into a lower portion of an air-lift conduit 320. Pressurized air 330 also enters at a lower portion of the air-lift conduit or conduit 320. Pressurized air 330 creates an upward flow. Off-gasses 340 are removed at an upper portion of the air-lift conduit 320. Water follows flow arrow C through a fluidic couple 350 into an eductor or down and out conduit 360. Treated water reenters the aquifer along flow path D.

The following description details an operational flow path of the groundwater as it enters exemplary decontamination system 300.

1) Groundwater enters from a well's top screen, which is high and low enough to envelope water level fluctuations. Both wells' top and bottom screens are surrounded with porous material such as sand, to facilitate hydraulic conductivity. An impermeable layer between sand layers outside the well, and a packer positioned in the middle of the decontamination system and the well's inside casing, prevent convection currents from short-circuiting.

2) Dense groundwater is pulled down intake conduit by suction created at the bottom intake port to the gas-lift conduit.

3) Groundwater and pressurized air meet at the bottom of the gas-lift conduit.

4) Flow is powered by the rising action of introduced air. The water is pushed up by the rising action of the bubbles and the density differential between the air entrained water and the denser, surrounding groundwater.

5) The air entrained water rises above the groundwater's level due to the density differential. The height the air/water mixture rises above the surrounding groundwater and is proportionate to the volume of water displaced by the air traveling through the gas-lift conduit. At the top of the gas-lift conduit, air separates from the groundwater.

6) The near original density groundwater now leaves the gas-lift conduit to the down and out conduit. The transfer portals between the two conduits have the same bottom elevation as the initial intake screen, but may also be higher, to accommodate the higher water column in the gas-lift conduit. This design allows for water flow during any anticipated groundwater elevation.

7) The components in the groundwater with sufficient vapor pressure will have transferred from the liquid to the gas phase, through a process called air stripping. These components will be carried off with the exiting air, for possible further treatment, prior to either venting to the atmosphere or being recycled back to the bottom of the air-lift conduit. Air bubbles contacting the water also increase the level of dissolved oxygen in groundwater.

8) Purified and oxygenated groundwater leaves the fluid flow decontamination system through the bottom of the well where it reenters the environment.

Figure 4:
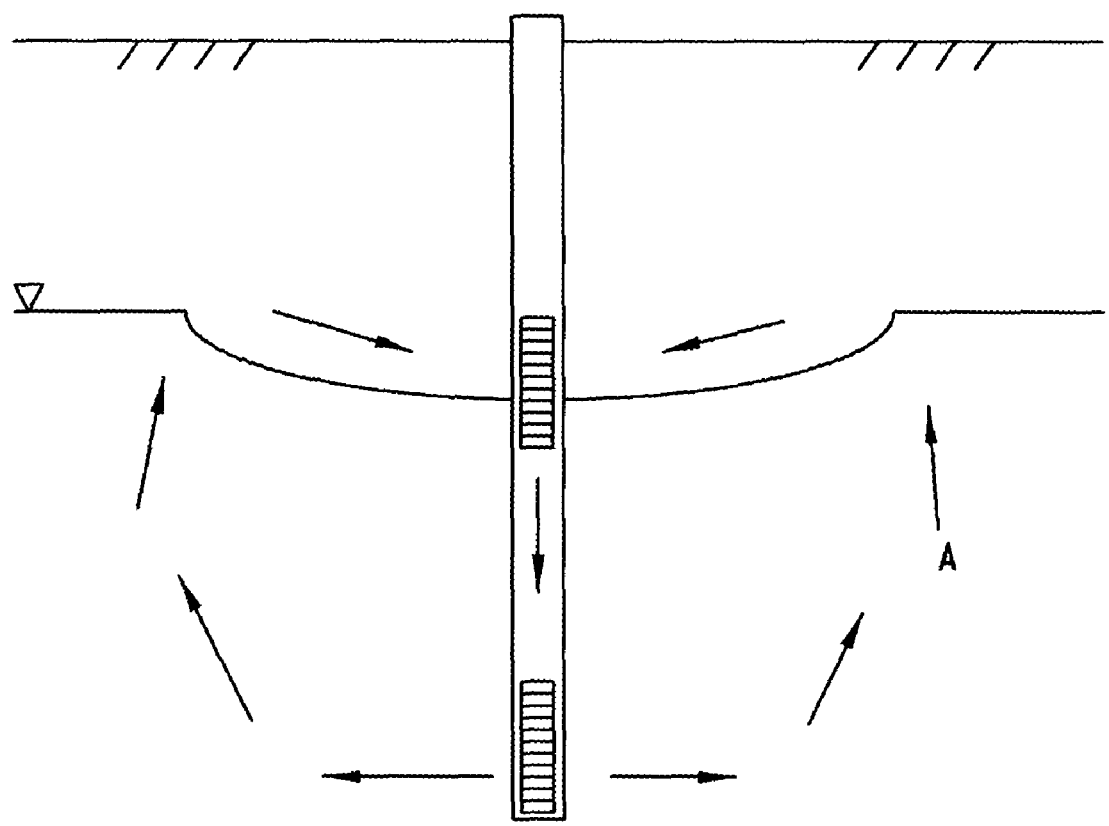
FIG. 4 illustrates a flow pattern of a remediation system in accordance with an aspect of the invention.

9) FIG. 4 illustrates the flow pattern A of the remediation system. As illustrated, the fluid flow remediation system of the present invention creates an upward and inward current draw which serves to contract the plume and accelerates remediation of the site. The outward pressure of water at the bottom of the well coupled with the cone of depression created by the suction of the device will create convection currents. These currents will push the groundwater away from the bottom of the well, upwards, and inwards toward the top of the well. This action will continually flush the soil, facilitating contaminant desorption and/or detachment, which is ultimately the rate limiting step in most soil remediation processes. This convection pattern will also help to contract other expanding plumes p One exemplary embodiment of the fluid flow remediation system 500 is illustrated in FIG. 5, which also depicts a functional prototype. The fluid flow system 500 is used as an in situ groundwater remediation device 510. A casing 515 is positioned inside a borehole 520, and the fluid flow system/remediation system 510 is positioned within the casing 515. The casing includes slots 517 at an upper end and slots 518 at a lower end to allow groundwater to flow into and, if needed, out of the casing 515. A packer 522 is positioned between the casing 515 and an outer housing of the remediation system 510.

The fluid flow system 500 includes a first conduit 540, a second conduit 550 fluidly connected with the first conduit, and a third conduit 560 fluidly connected with the second conduit 550. The three conduits are concentric, with the intake at the outside, the gas-lift in the middle, and the down and out nearest to the center.

The first outside conduit 540, alternatively referred to as the intake conduit, may include a too cap 546 and a bottom cap 544. In addition the first outside conduit 540 includes perforations 542 to allow groundwater to flow into the outside conduit 540. The perforations 542 in the intake conduit 540 of the present embodiment are positioned to incorporate the groundwater table elevation range and anticipated drawdown as described previously.

The second middle conduit 550, alternatively called the gas-lift conduit, includes a top portion having a cap 552 thereon. The cap 552 is sealed to prevent gas or fluid from escaping, which could, in turn, pressurize the intake passage, and possibly preclude inflow. The cap 552 includes water and airtight apertures for an off-gassing line 554, a gas intake line 556, and an optional retrieval cable 558. In accordance with the present embodiment, the gas-lift conduit is in fluid communication with the intake conduit 540. The gas-lift conduit 550 includes an open end 559, allowing water to flow into the bottom of the gas-lift conduit 550 from the intake conduit 540. The intake line 556 includes an air discharge device 557 at the distal end positioned within and near the bottom of the second conduit 550, such that bubbles can only rise inside the gas-lift conduit.

The third center conduit 560 is in fluid communication with the second conduit 550 through a series of perforations 562 at a top end of the third conduit 560. The perforations 562 are positioned to incorporate the increase of the water table elevation from the lower density air-entrained water, and hence elevated water in the second conduit. As gas is passed through the off-gassing line 554, near original density water flows through the perforations 562 down through the third conduit 560 and out through an outlet 564 positioned above the elevation of the casing 515. The water passes through outlet 518 and the surrounding sand prior to returning to the aquifer. The water leaving the outlet 518 typically contains a higher level of dissolved oxygen and lowered levels of VOCs than the water entering perforations 542.

Figure 6A:
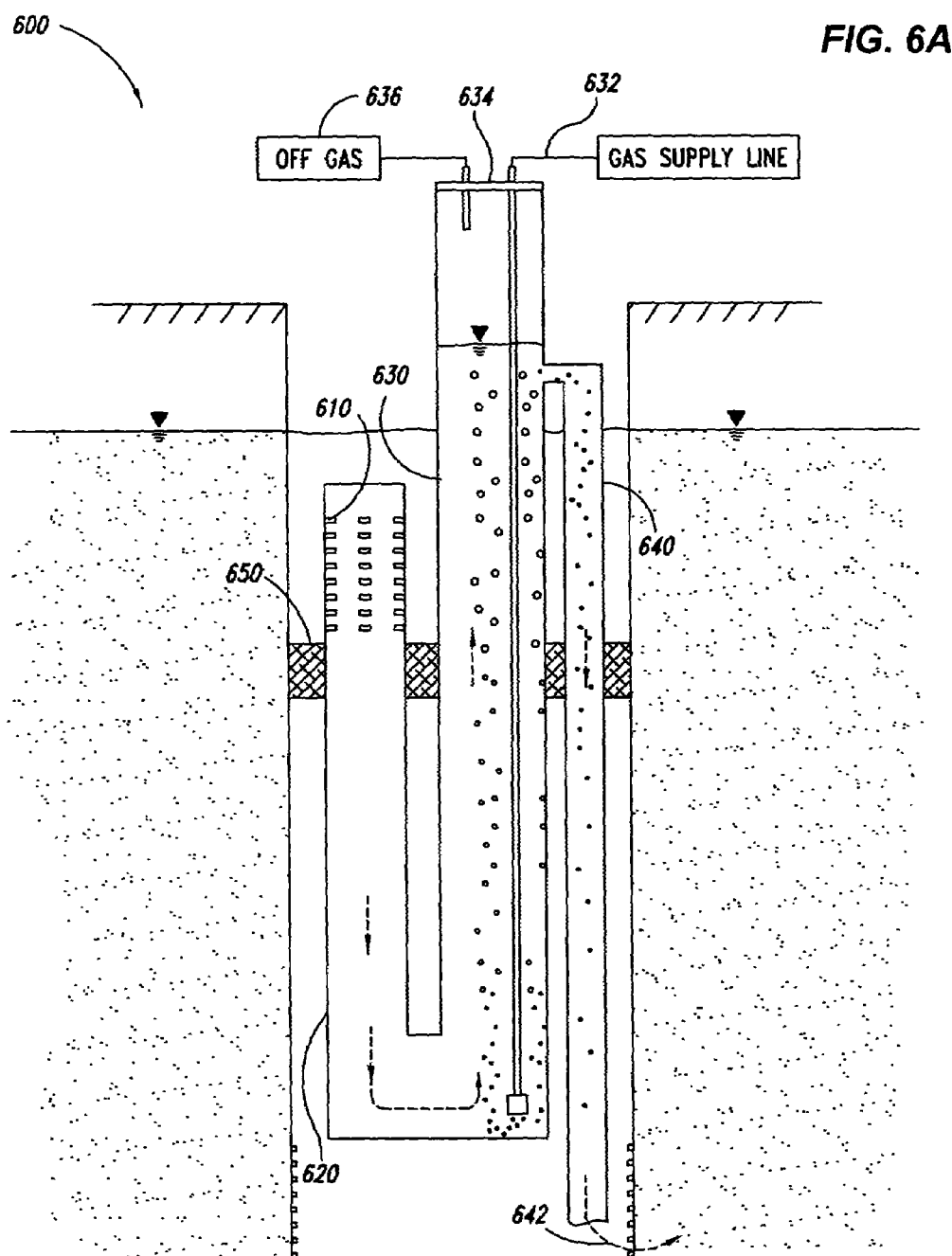
FIG. 6A illustrates an embodiment of a fluid flow remediation system in which the conduits are spatially separated.
Figure 6B:
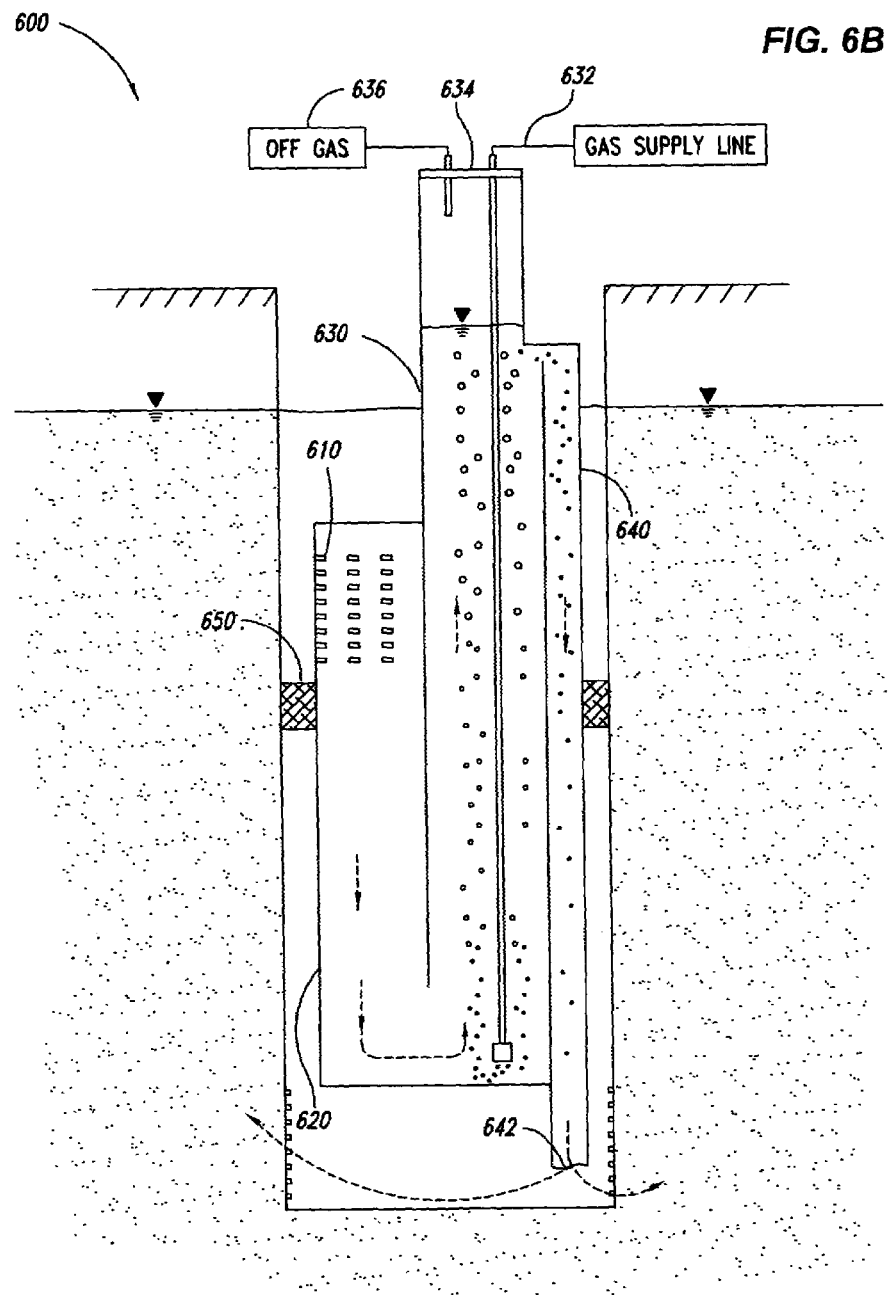
FIG. 6B illustrates an embodiment of a fluid flow remediation system in which the conduits are adjacent.

Yet another alternative embodiment of the present invention is shown in FIGS. 6A and 6B. FIGS. 6A and 6B illustrate non-concentric conduits of the water flow system in use as a fluid flow water remediation system 600. FIG. 6A illustrates spatially separated conduits, while 6B depicts vertically adjacent conduits. As discussed with respect to FIG. 5, FIGS. 6A and 6B include slots or perforations 610 allowing fluid to flow into a first conduit 620. The first conduit 620 is in fluid communication with a second conduit or chamber 630. The second chamber includes a gas supply line 632 for supplying gas into the conduit. In the present embodiment the gas supply line is positioned at the lower elevation of the second conduit. The addition of gas into the second conduit provides a density differential in the fluid, yielding a less dense fluid and increasing the height of the water table elevation. The top of the second conduit 630 includes an air and watertight cap 634. The gas supply line 632 may penetrate this cap 634. Additionally, an off-gas line 636 is provided which may also perforate the cap 634. Alternatively, the cap 634 may incorporate a gas absorption device and may not require a separate off-gassing line.

The lower density fluid contained in the second conduit 630 is in fluid communication with the third outlet conduit 640. As entrained gas is off-gassed through the off-gas line 636 or through a gas absorption cap 634, the water density decreases and through natural convection flows down through the third conduit 640. In operation, some of the gas bubbles are trapped as the water begins to flow down the third conduit 640, and may dissolve in the length of laminar flow provided in the third conduit. The third conduit 640 includes an outlet 642 positioned at the lower elevation of the conduit to allow the fluid to re-enter into the aquifer. Water flowing back into the aquifer has been stripped of volatile organic compounds and other contaminants with sufficient vapor pressures, and additionally includes higher levels of dissolved oxygen, thus providing an increased remediation and volatilization effect upon re-entering into the aquifer.

A packer 650, prevents short-circuiting of convection currents between the borehole and the conduits shown in FIGS. 6A and 6B.

Another embodiment of these applications provides in-well air stripping and an increased level of dissolved oxygen, but generates no through-the-formation convection currents. An advantage of this configuration, which has no lower well screen, is that it allows treatment of an upper aquifer, without potential cross-contamination of a deeper aquifer.

Thus, according to the description above, and aspects of the present invention, the fluid flow remediation system includes three water conduits. The conduits may be concentric, adjacent vertically or spatially separated. The first and/or outer conduit will convey groundwater from at, or immediately below, the groundwater's surface to the bottom of the device. Water then passes from the first conduit into the second, now moving up instead of down. The second water conduit also has air supplied to it, at or near its bottom. The rising air will then lift the water up through the second tube by both the pushing action of upwelling bubbles and the resultant density difference between air entrained water and the denser water of the first conduit. At the top of the second, air-lift conduit, the air is allowed to separate from the water and leave the device, for possible further treatment and/or recycling. Now the water passes into the third and final conduit, again making a U-turn, where it exits down the device and out, to the bottom of the well.

The first conduit allows groundwater to enter such that, when situated in the well, the screen's height will allow water to enter during the highest to the lowest groundwater elevations, similar to the top well screen. The third conduit, i.e., the down and out conduit, is screened to the same bottom elevation as the first tube and top well screen, but its top openings will be higher to facilitate the air-lifted water in the second conduit or chamber 630. These screening widths allow for continuous groundwater flow, for predicted groundwater elevation fluctuations.

The decontamination system thus may remediate groundwater and surrounding soils through methods, including:

1. Introducing oxygenated water to the bottom of the well and out into the surrounding environment promotes biological activity and helps to volatize contaminants;

2. The rising air bubbles in the second conduit create an in-well air stripper, transferring contaminants from the liquid to the vapor phase;

3. The resulting convection currents push and pull groundwater up toward the top of the device, helping to contract the plume; and 4. The upward and inward currents also flush the surrounding soils, accelerating contaminant desorption and/or detachment.

This design can also be configured to work in conjunction with existing, or new, conventional air-sparge remediation systems, adding the last three listed benefits to the first.

Potential problems associated with iron fouling may be addressed by incorporating $CO_2$ into the air's intake, depressing the pH and keeping the iron in solution, depending on the alkalinity and buffering capacity of the groundwater and soil.

According to aspects of the present invention, the fluid flow system and methods as described above and as applied to a remediation system can also be used in the following applications:

Pneumatic Pump

Figure 7:
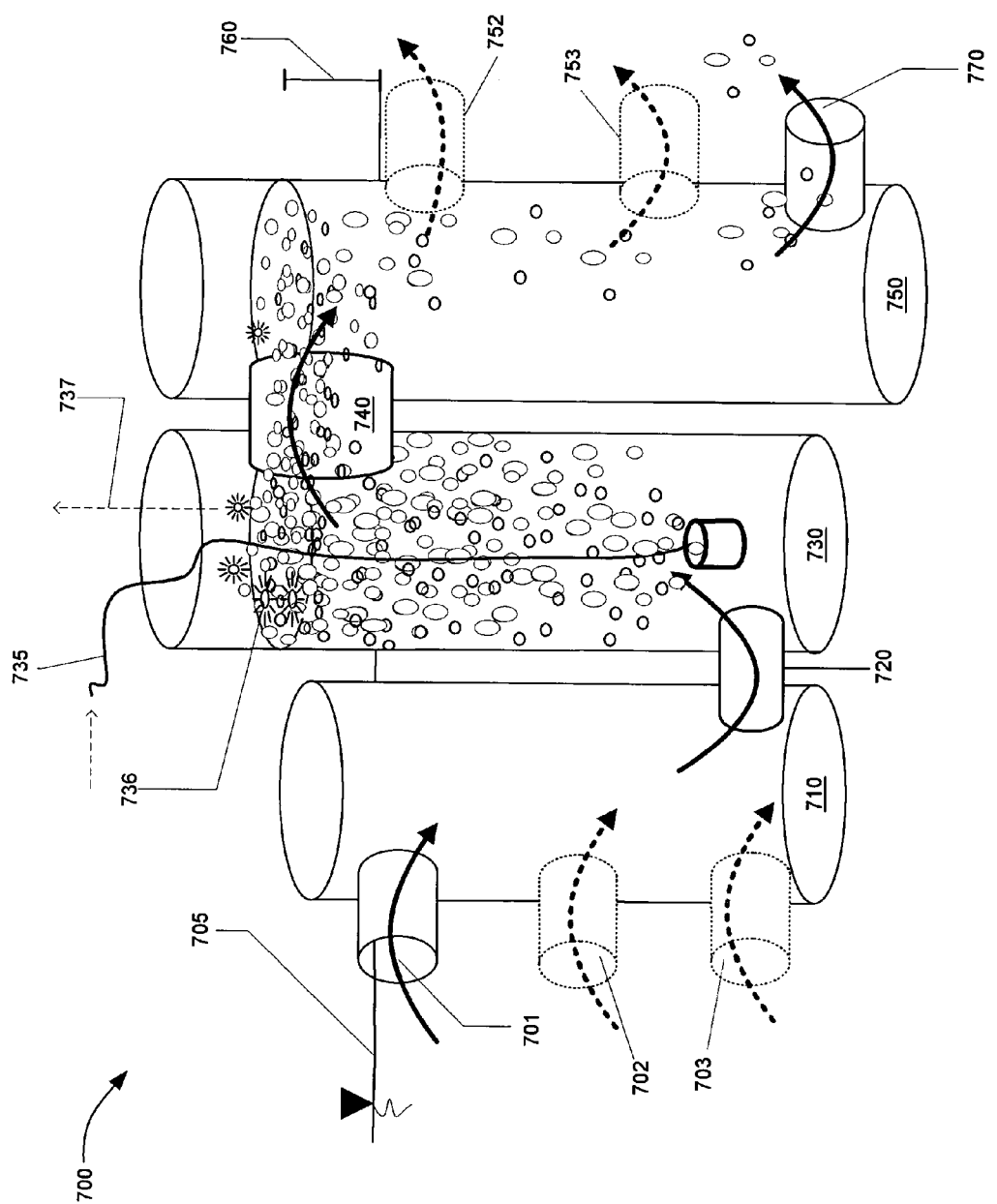
FIG. 7 illustrates a pneumatic pump in accordance with an aspect of the invention.

FIG. 7 shows an illustration of a pneumatic pump, according to one embodiment of the invention. Gas bubbles in the gas-lift conduit can be sized for specific applications; smaller bubbles facilitate gas transfer, while larger bubbles create greater density differences.

Line 705 depicts the static fluid level. In one embodiment of the invention, one entry port is included. In other embodiments of the invention, multiple intake ports are included. When a single intake port is included, the intake port is positioned at an intake level desired. When multiple intake ports are included, one or more of the intake ports may be selected to collect fluid from the environment. The selected intake ports may then be opened, uncapped, or unblocked, while the non-selected intake ports may be closed, capped, or blocked to prevent fluid flow. What intake port or ports are selected depends on the requirements of a particular system. In system 700, fluid from the environment enters through entry port 701. Entry ports 702 and 703 are closed.

It will be recognized that when unsealed the bottoms of passages 710 and 730 may also be used as intake ports. To prevent fluid from being collected from the bottoms of chambers 710 and 730, the bottoms may be sealed.

A first chamber 710 is in fluid communication with a second chamber 730 through a bottom conduit 720. Gas enters chamber 730 through line 735. Preferably, gas is emitted into chamber at or near the bottom of chamber 730. The gas travels through the mixture and exits the fluid at fluid/gas interface 736 and leaves the pump through opening 737. The second chamber 730 is in fluid communication with a third chamber 750 through the upper conduit 740.

At 770, the fluid exits the pump out an exit portal. In one embodiment of the invention, one exit portal is included. In other embodiments of the invention, multiple exit portals are included. When a single exit portal is included, the exit portal is positioned at an exit level desired. When multiple exit portals are included, one or more of the exit portals may be selected for allowing fluid to enter into the environment. The selected exit portals may then be opened, uncapped, or unblocked, while the non-selected exit portals may be closed, capped, or blocked to prevent fluid flow. What exit portal or portals are selected depends on the requirements of a particular system.

In system 700, fluid exits the third chamber 750 through exit portal 75 1. Exit portals 752 and 753 are alternative exit paths that are closed in one embodiment of system 700. Differential fluid level 760 depicts the additional height the fluid is raised above the static fluid level 705. Differential fluid level 760 is proportionate to the volume of gas traveling through the fluid. The flow velocity and or volume generated are also directly proportionate to this height.

Hypolimnetic Aeration

Figure 8:
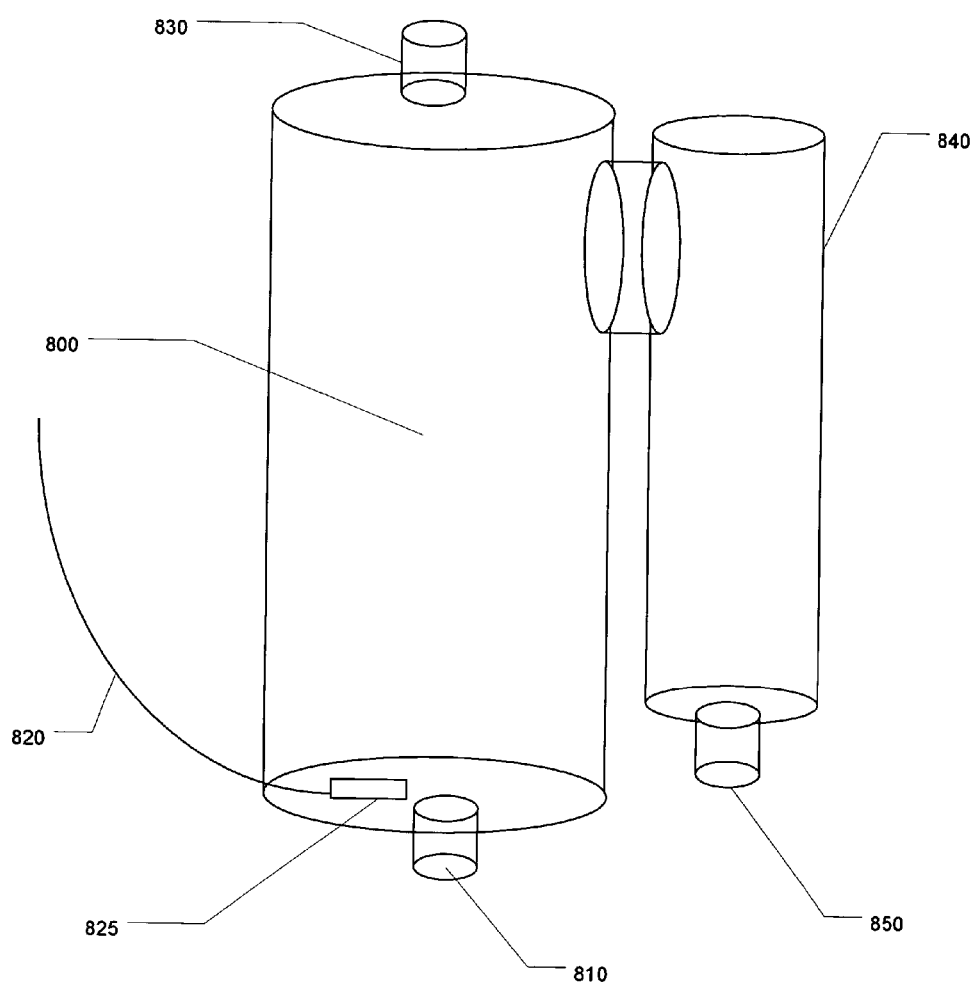
FIG. 8 illustrates an embodiment of the invention that may be used to oxygenate water in a lake or pond.

FIG. 8 shows an embodiment of the invention that may be used to oxygenate water in a lake or pond. This embodiment facilitates aeration of lower (anoxic) thermally stratified layers in lakes and oxygen deficient ponds by creating downward fluid flow of oxygenated water.

Deeper bodies of water have the coldest, densest water settle at the bottom, where little mixing occurs and biological demands deplete oxygen levels. These lower levels then become inaccessible to oxygen-requiring species. Alternatively, many ponds have elevated levels of nutrients, which in turn, foster oxygen depleting algae blooms. To remedy these conditions, hypolimnetic aeration may be employed by pumping bottom water to a surface fountain spray. This method of elevating levels of dissolved oxygen, however, requires high capital, maintenance, and energy costs The deeper the water, the longer a fluid flow can be in the gas-lift passage. Longer passage extends air/water contact time, which maximizes oxygen air to water transfer. By placing an inlet conduit at the bottom of a gas-lift conduit (or eliminating it altogether), water is brought into immediate contact with the rising air bubbles. Alternatively, the inlet passage might extend to the bottom of the lake, drawing the water with the lowest level of dissolved oxygen and moving it upward to a more convenient location. Regardless of the intake configuration, the fluid flow system design of the present invention can be employed to both increase air bubble/water contact time and return the oxygenated water to a more oxygen-depleted region.

In a lake or large pond, there may be a relatively large volume of water to be aerated. To sufficiently aerate the water, the size of gas lift passage 805 may be increased appropriately. Water enters gas lift passage 805 through inlet 810. Water may be drawn from the anoxic depths of the body of water through an intake conduit/hose (not shown) attached to the bottom of gas lift passage 800. Pressurized air is supplied through one or more appropriately sized lines 820. Air diffuser 825 may be mounted directly on the bottom of the gas lift passage. The gas leaves the aeration device at the top of the gas lift passage through a gas exit portal 830. Down and out passage 840 is the passage through which water is returned. Down and out passage 840 may be a separate passage (as shown) or simply a fluid connection near the top of the gas lift passage. Whether down and out passage 840 is a separate passage or a fluid connection depends on where one desires to return the aerated water. Exit portal 850 provides an opening through which aerated water passes to return to the lake or pond. It will be recognized that the length of down and out passage 840 may be adjusted to return water at any given level without departing from the spirit or scope of the invention.

System 800 has many advantages over conventional pump-and-spray methods hypolimnetic aeration, including:

1. It can be configured with no moving parts to corrode or short in the water;
2. The natural aesthetics of the environment can be maintained;
3. Pushing air into water to create the fluid flow is considerably more energy efficient than pulling water to the surface and spraying it up into the air; and
4. Whereas fountains return oxygenated water to the surface where the aerated water is needed the least, system 800 may be configured to return the water to a selected location, such as closer to the bottom of a body of water where there is little oxygen.

Aquarium Surface Skimmer and Current Generator

Figure 9:
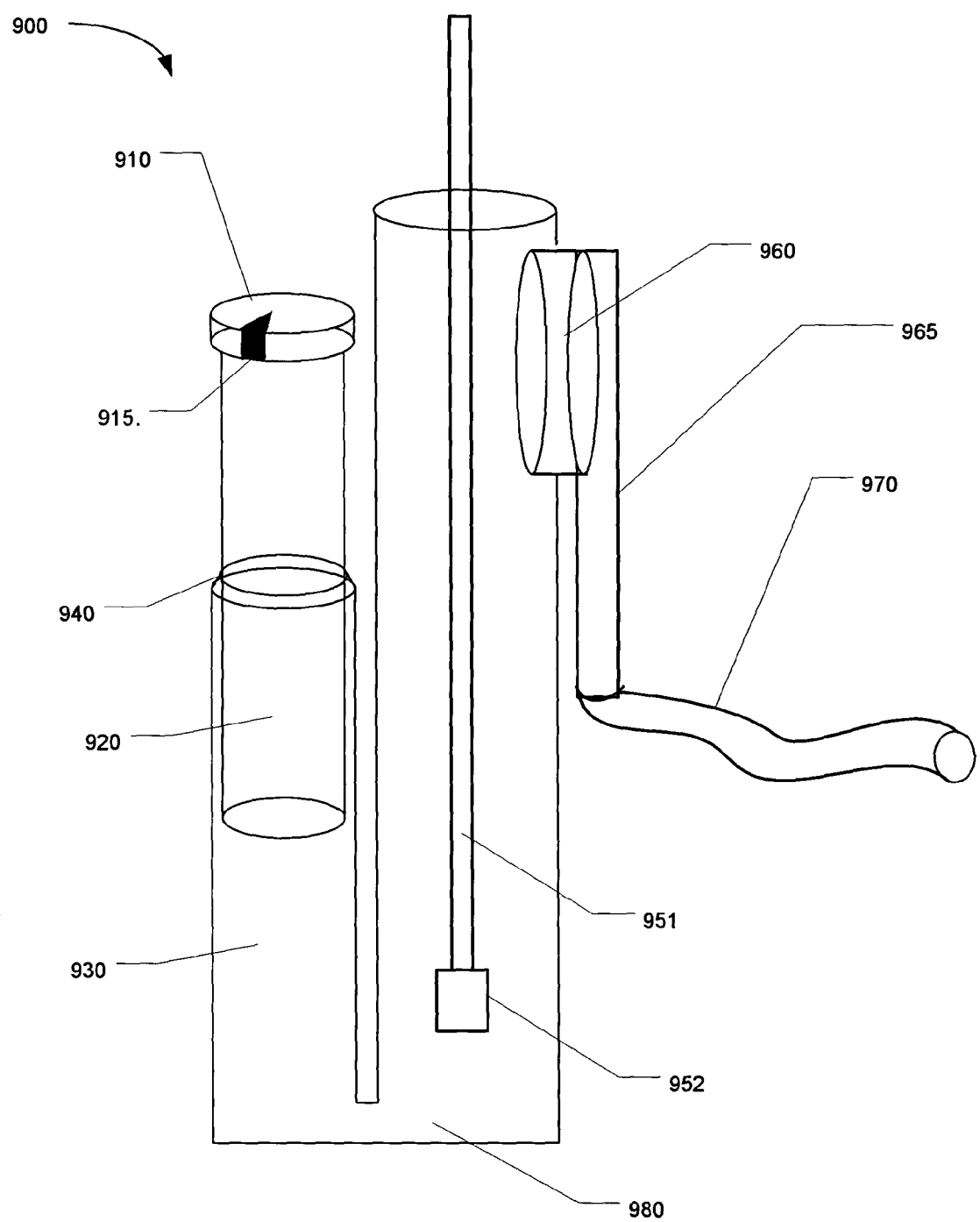
FIG. 9 illustrates an embodiment of the invention that may be used in an aquarium.

FIG. 9 shows an embodiment of the invention that may be used in an aquarium. System 900 includes, among other things, an inlet 915 and a down and out conduit 965. The inlet 915 functions as a surface skimmer, while down and out conduit 965 can be configured to create a sideways, in-tank current.

Traditional under-gravel filters pull water up with an air stone in a tube. Instead of having the inlet passage connect to an under-gravel elevated screen, however, the inlet passage of system 900 floats at the surface, acting as a surface skimmer. Surface skimmers act to pull insoluble floating debris that will otherwise accumulate. Once re-suspended in the water, the wax-like platelets can be removed through existing filters. Instead of having the air-lifted water spill out randomly at the surface, where the water already has the highest level of naturally occurring oxygen levels, the now flexible down and out tube can be strategically located to both oxygenate lower levels of the aquarium and create a current.

Intake passage 930 consists of two telescoping tubes, whose overlap 920 is sufficient to encompass anticipated water levels. The top intake has a notch 915 to focus flow from the surface only. The notch is held on the surface by a float 910 attached to the intake tube. The point of contact 940 between the two tubes is relatively water-tight, but loose enough to allow up and down movement of the inner intake tube when adjusting to fluctuating water levels in the tank. The gas lift passage 980 has air supplied toil by an air line 951 equipped with an air stone emitter 952 at or near the bottom of gas lift passage 980. The down and out passage 965 is herein also depicted as spatially separated and in fluid communication with the gas lift passage at 960. The down and out passage may be connected to a semi-rigid tube 970 which can be bent and positioned such that in-tank flows are generated where desired.

The unit may be constructed of a material with sufficient density to preclude its loosing a vertical orientation during operation, may be affixed to the tank's glass walls with suction cups, and/or may be weighted at the bottom.

In this embodiment, optimal flows may be achieved with a vertical orientation of the gas lift passage 980. Other orientation are contemplated and within the spirit and scope of the invention, but should be used when a less than optimal flow is allowable, e.g. to satisfy aesthetic requirements or otherwise. It should be understood that an orientation other than vertical will cause the rising bubbles to congregate on the upper inside edge. In an orientation other than vertical, a density difference will still be created and flows will still be generated, but the system will not operate as efficiently as a strictly vertical orientation, This is because a uniform cross-section of rising gas pockets (as happens in a vertical orientation) tends to lessen inside passage counter currents.

While not necessarily a replacement, system 900 has many advantages over conventional aquarium systems, including:

1. The ability to skim the surface;
2. The elevation of dissolved oxygen levels;
3. The ability to strategically place the return of oxygenated water (and its associated current); and
4. The ability to use existing aquarium air pumps.

Wastewater Treatment

Figure 10:
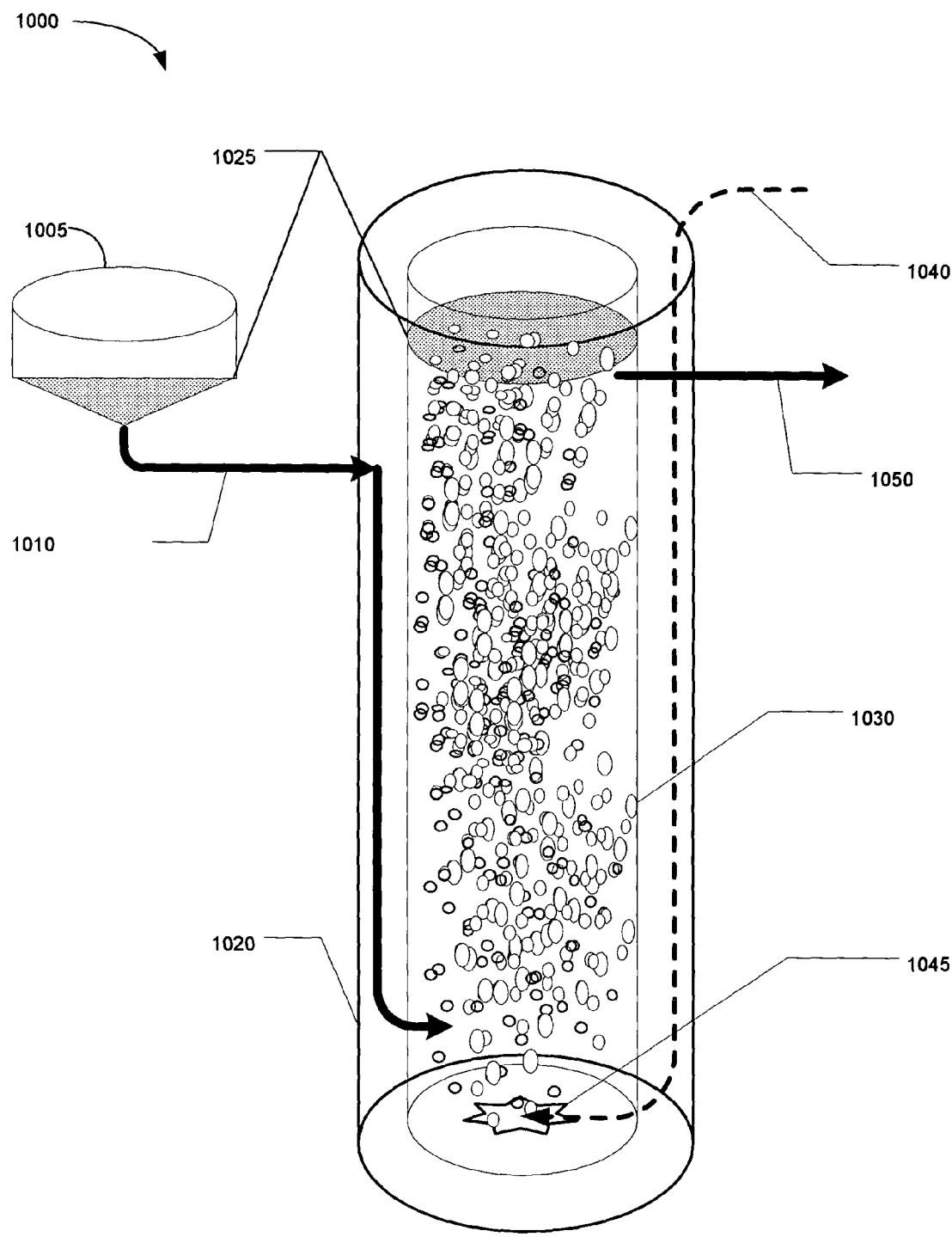
FIG. 10 illustrates an embodiment of the invention that may be employed in wastewater treatment.

FIG. 10 shows an embodiment of the invention that may be employed in wastewater treatment. System 1000 as shown in FIG. 10 lends itself to aeration, mixing, and fluid transfer during wastewater treatment, especially applicable in waste activated sludge (WAS) processes.

Bacterial decomposition of the majority of constituents found in wastewater (residential, industrial, or agricultural) results in the depletion of levels of dissolved oxygen. Untreated releases of wastewaters can create waters with levels of dissolved oxygen so low as to be toxic. Therefore, a design consideration in biological treatment of wastewater is to provide $O_2$ to bacteria, prior to release. In one embodiment of system 1000, this is done without any moving parts in the wastewater to be treated. In other embodiments of the system, moving parts may be combined with system 1000 to treat the wastewater.

Almost universally in the United States, larger municipalities utilize WAS systems in an attempt to minimize land requirements. Unfortunately WAS systems require high energy inputs. The basic idea is to mix very high concentrations of bacteria with the wastewater in large holding tanks that have large volumes of air passing up from the bottom.

The high pressure diffusers emit air which passes directly from the bottom to the top of the tank. Extending the contact time with the air (as described in the present invention) improves the gas to liquid transfer of oxygen. System 1000's fluid flow design extends this contact time a duration which is proportionate to the additional elevation gained in the gas lift passage (which in turn is proportionate to the volume of gas passing through the liquid).

Selecting appropriate fluid entry and exit points facilitates greater mixing and helps eliminate stagnate region in the tanks. Not only could these benefits be derived with little or no additional energy requirements, but with the prolonged contact time less air would need to be injected to achieve the same net rate of oxygen transfer. By collecting and treating the gas exiting from the gas lift passage, greater odor control is possible.

In conventional wastewater treatment facilities, transfer of sediments and settled sludge between unit processes is another major energy drain. System 1000 may be used for pumping between tanks with the benefits of lower energy costs, no moving parts being abraded by sediments, and additional aeration during transfer.

System 1000 has an intake 1005 in fluid communication with the sediments collected from a primary or secondary clarifier 1010. The entire unit maybe located in a large, deep dry well 1020 to provide for a significant travel time of the air through the sludge and a significant volume for a head generating height differential 1025.

The gas lift passage 1030 is sized to conform with the dimensions of the dry well, again to increase contact time and entrained air volume.

Pressurized air is supplied through line or lines 1040 and emitted through a diffuser 1045 at or near the bottom of gas lift passage 1030. The down and out passage 1050 is a conduit to the next unit process.

While the invention's fluid flow system generates relatively little head, well designed wastewater treatment plants are largely gravity flow, with minimal pressure head requirements. Head could be increased by inserting system 1000 in dry wells, strategically located between unit processes. By creating a longer gas lift passage inside the dry well, more air can pass through the liquid before exiting out the top. The more air in the wastewater, the greater the height differential between the intake level and the exit level.

Other Applications and Embodiments of the Invention

In addition to the applications above, embodiments of the invention may also be used in the following applications:

Expediting Chemical Mixing and/or Reactions. One embodiment of a system configured in accordance with the invention moves less dense fluids from the top of reaction chamber to desired level. Gas can be used as an inert mixer, reactant, or used to strip out components. Controlling the gas's temperature may also benefit process reaction rates.

Food Processing: One embodiment of a system configured in accordance with the invention facilitates food processing where introducing or stripping out a gas is desired. In addition, or alternatively, the system may also be used to facilitate mixing. Maintaining specific injection gas temperature can provide additional process control.

One example of an embodiment of the invention configured to process food involves the processing of mustard. Large vats allow the heavier components to settle downward, leaving the less dense, more fluid portion, at the surface. This same phenomenon is also often observed when dispensing this condiment on hot dogs: the runny stuff pours out first. Vat mixers typically utilize motor driven paddles, which are engineered such that a sufficient vortex must be created to pull the top layers down and homogenize the entire mixture. The major drawback is that the vat's entire contents must be vigorously stirred; no specific zones are targeted for mixing.

Greater homogeneity is facilitated by incorporating embodiments of the invention's fluid flow system during processing. Light fluid layers on top are pulled down, mixed in the passages, and release at targeted zones. In one embodiment, the only energy require for mixing is that used in compressing gas to be used in the system. Besides energy savings, cleaning, maintenance, and replacement cost savings could also be realized as there is not a requirement for moving parts to be placed in the fluid.

Emulsifier. One embodiment of a system configured in accordance with the invention facilitates mixing to the point of forming an emulsion.

Fermentation Facilitator. One embodiment of a system configured in accordance with the invention employs naturally occurring carbon dioxide that off-gasses as a result of fermentation to mix otherwise stratifying layers.

Gas Stripper. One embodiment of a system configured in accordance with the invention strips one gas from a liquid by injecting another gas for which the liquid has a greater affinity. This may be used, for example, to remove oxygen from water by injecting nitrogen Medical Gas Diffuser. One embodiment of a system configured in accordance with the invention strips oxygen out of blood by using nitrogen in a gas-lift conduit. In this embodiment no moving parts are placed within the gas-lift chamber and the removal of oxygen can occur without rupturing any blood cells by the movement of parts in the gas-lift chamber.

Mixing System. One embodiment of a system configured in accordance with the invention addresses mixing problems associated with stagnation in finished water storage tanks. Finished water storage tank reservoirs have issues with respect to deterioration of water quality. The most common problems are the loss of disinfectant residual resulting from poor mixing and circulation, hydraulic short-circuiting, poor turnover rate, and excessive pathogen detection time. Stagnation and dead spots lead to serious water quality issues such as the formation and proliferation of bacteria.

In one embodiment of the invention, the water intake and outtake conduits of the invention's fluid flow system are located in a finished water reservoir to flush out targeted dead spots and maintain a more uniform distribution of temperature, dissolved oxygen, and disinfectant residual. Part or all of the gas utilized in the gas-lift passage may be chlorine and/or some other disinfectant gas to restore disinfectant residuals to optimal levels.

Novelty/Aesthetics. One embodiment of a system configured in accordance with the invention creates a visually pleasing effect. This is accomplished through upward and downward flowing bubbles. This effect may be augmented with fluids that change color when gas in injected, lights, colored immiscible fluids, and the like.

In some embodiments of the invention, the collector conduit may comprise an inlet port at or near the same level as the gas release point in the gas-lift conduit. In other embodiments of the invention, the collector conduit may comprise holes in the side of the gas-lift conduit. In yet other embodiments of the invention, the collector conduit may draw fluid from a point (or points) distant to the gas-lift passage. Further, the outlet conduit can may be an outlet port at or near the gas/liquid separation point in the gas-lift conduit, holes in the side of the gas-lift conduit, or a conduit that passes the liquid to some point (or points) distant from the gas/liquid separation point. For more effective use, the collector and outlet conduits should not simultaneously be just a port at or near the gas release point in the gas-lift conduit. Similarly, both the collector and outlet conduits preferably should not simultaneously be located at or near the gas/liquid separation point or be just a port at or near the gas release point in the gas-lift conduit. Preferably, both conduits should not simultaneously exist as simple holes in the side of the gas-lift conduit. If the inlet for the collector conduit is near the gas release point in the gas-lift conduit, then preferably the down and out conduit should extend down below the liquid's surface in the gas-lift conduit. Similarly, if the outlet for the down and out conduit exits at or near the gas/liquid separation point in the gas-lift conduit, then preferably the collector conduit should extend above the gas emission point in the gas-lift conduit. The guidelines in this paragraph are not required to practice the invention but may be used to create a more effective system.

All of the U.S. patents, U.S. patent application publications, U.S. patent applications, foreign patents, foreign patent applications, and non-patent publications referred to in this document are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention resides in the claims hereinafter appended.

What is claimed is:

1. A method for creating a fluid flow path, comprising:
providing a first containment region fluidly connected to a second containment region, the first containment region having an inlet that receives a fluid;
injecting pressurized gas into the second containment region at a rate to cause the fluid in the second containment region to rise higher than the inlet;
removing gas from the second containment region; and
providing a third containment region fluidly connected to the second containment region, wherein the third containment region includes an outlet.

2. The method of claim 1, wherein the inlet is at a first elevation and the outlet is at a second elevation, and wherein the second elevation is lower than the first elevation.

3. The method of claim 2, wherein at least some of the fluid enters the first containment region through the inlet, travels down in the first containment region, travels up in the second containment region, travels down in the third containment region and exits at the outlet.

4. The method of claim 3, wherein the at least some of the fluid that exits the outlet contains some of the gas.

5. The method of claim 1, wherein the containment regions are radially located with respect to each other.

6. A method for removing contaminants from groundwater, comprising:
providing a borehole extending from the ground surface into the saturated zone;
providing a casing within the borehole, the casing having a lower fluid-permeable section below the water table and an upper fluid-permeable section at the water table;
providing a groundwater remediation system that includes three separate chambers, a first chamber including an inlet and fluidly connected to a second chamber, a second chamber including a gas supply line for injecting gas into the chamber wherein the second chamber is fluidly connected to a third chamber, wherein treated water exits an outlet in the third chamber at a distal end of the remediation system from the inlet.

7. The method of claim 6, wherein the outlet is lower in elevation than the inlet.

8. The method of claim 7, wherein at least some of the gas exits with the treated water.

9. The method of claim 7, further comprising providing a impermeable layer between the casing and the borehole to prevent convection currents from short-circuiting outside the casing within the borehole.

10. An apparatus for in situ decontamination of a contaminated groundwater, comprising:
a collector conduit, the collector conduit having a proximal and distal end, the proximal end having at least one opening to allow fluid to flow therein,
a gas-lift conduit in fluid communication with the collector conduit,
a pump for pumping a gas into the gas-lift conduit, and
a return conduit in fluid communication with the gas-lift conduit, the return conduit further including an outlet port at an end distal to the proximal end of the collector conduit.

11. The apparatus of claim 10, wherein the outlet port is lower in elevation than the at least one opening of the collector conduit.

12. The apparatus of claim 11, wherein at least some of the fluid exits with at least some of the gas through the outlet port.

13. The apparatus of claim 10, wherein the at least one-opening encompasses anticipated high, low, and drawdown levels of the groundwater.

14. A system for decontamination contaminated groundwater in situ, comprising:
a borehole having a bottom elevation below a water level of the contaminated groundwater;
a first housing positioned within the borehole, the first housing having an inlet, wherein the inlet is positioned below the water level;
a second housing positioned within the borehole in fluid communication with the first housing;
a third housing positioned within the borehole and in fluid communication with the second housing
a diffuser for dispersing a gas into the second housing such that a density differential in the water of the second housing creates a convection flow within the decontamination system, wherein the convection flow causes fluid within the first housing to he drawn downwards.

15. The system of claim 14, wherein the third housing includes an outlet and wherein the outlet is lower in elevation than the inlet.

16. The system of claim 15, wherein at least some of the groundwater that enters the inlet exits combined with at least some of the gas through the outlet.

17. A system for creating a fluid flow path, comprising:
an apparatus comprising:

a collector conduit having a first and a second end, the first end having at least one opening to allow fluid to flow into the collector conduit, a gas-lift conduit fluidly connected to the collector conduit, and a return conduit fluidly connected with the gas-lift conduit, the return conduit including at least one outlet port at an end distal to the first end of the collector conduit, wherein the at least one opening is higher in elevation than the at least one outlet port; and a pump configured to pump a gas into the gas-lift conduit.

18. The system of claim 17, wherein the apparatus is used as a pneumatic pump.

19. The system of claim 17, wherein the apparatus provides oxygenated water to a hypolimnetic layer of a body of water.

20. The system of claim 17, wherein the at least one opening on the first end comprises a surface skimmer of an aquarium or pool.

21. The system of claim 20, wherein the return conduit is a semi-rigid tube.

22. The system of claim 17, wherein the apparatus is configured to treat wastewater.

23. The system of claim 17, wherein the apparatus is configured to move fluids from a higher elevation of a reaction chamber to a lower elevation of the reaction chamber.

24. The system of claim 17, wherein the system comprises a food processing system and wherein apparatus is configured to introduce or strip out a gas in the food processing system.

25. The system of claim 17, wherein the apparatus forms an emulsion during operation.

26. The system of claim 17, wherein the pump produces the gas as a result of fermentation.

27. The system of claim 17, wherein the gas strips another gas from the fluid that flows through the apparatus.

28. The system of claim 27, wherein the fluid comprises blood, the gas comprises nitrogen, and the other gas comprises oxygen.

29. The system of claim 17, wherein the system further comprises a water storage tank and wherein return conduit is configured to provide the fluid to at least one location within the water storage tank.

30. The system of claim 17, wherein the gas provides visible bubbles, at least some of the bubbles flowing through the gas-lift conduit and at least some of the bubbles flowing through the return conduit.

31. The system of claim 30, wherein the fluid changes colors after coming into contact with the gas.

* * * * *